W. C. KELLUM.
Clock Escapement.
No. 81,789.
Patented Sept. 1, 1868.
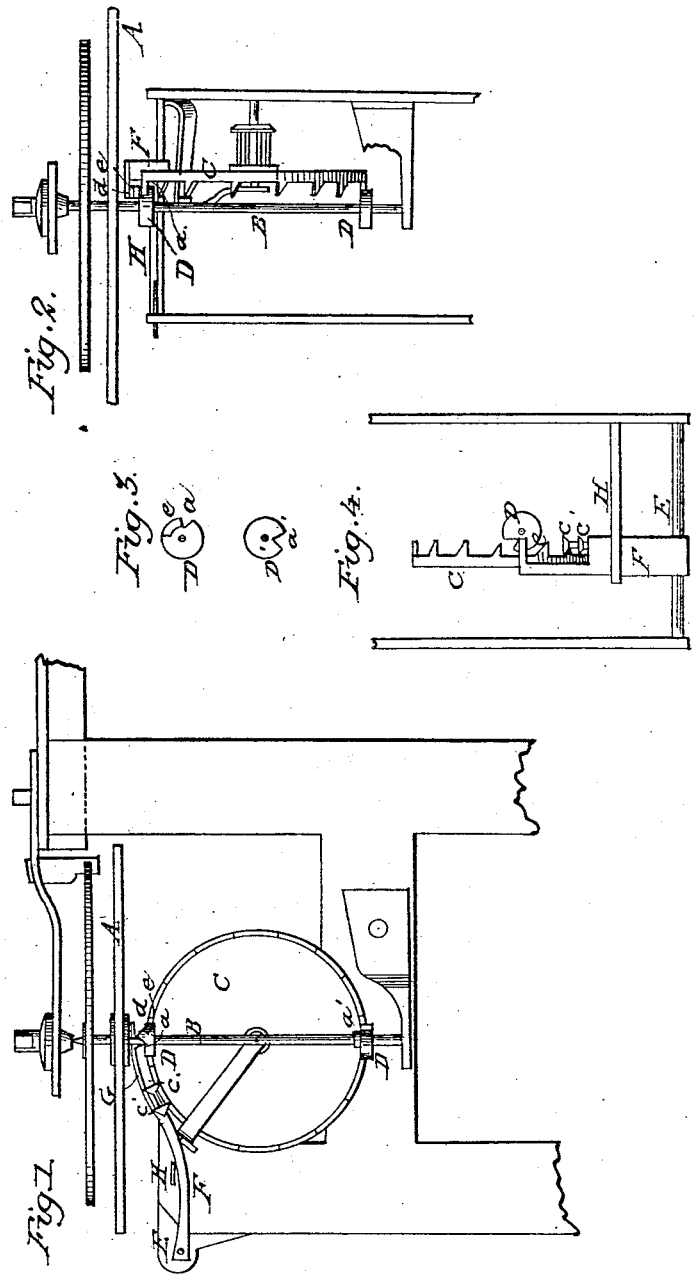
WITNESSES:
INVENTOR:

United States Patent Office.

WILLIAM C. KELLUM, OF SAN FRANCISCO, CALIFORNIA.

Letters Patent No. 81,789, dated September 1, 1868.

---

IMPROVED ESCAPEMENT.

---

The Schedule referred to in these Letters Patent and making part of the same.

---

TO ALL WHOM IT MAY CONCERN:

Be it known that I, WILLIAM C. KELLUM, of the city and county of San Francisco, State of California, have invented an Improved Crown-Wheel Chronometer; and I do hereby declare the following description and accompanying drawings are sufficient to enable any person skilled in the art or science to which it most nearly appertains to make and use my said invention or improvements without further invention or experiment.

The nature of my invention is the construction of an improved chronometer-escapement, and it has for its object, first, the use of a crown-wheel escapement, operating with two rollers on the balance-staff, so as to give the balance an impulse in each direction as it vibrates, and secondly, of a double-headed screw in connection with the detent-lever, by which each tooth of the escape-wheel is locked twice at each double or completed vibration of the balance, the rollers being thus cleared from the teeth of the wheel after the impulse has been given. It also consists in so placing the detent-lever that it locks by gravitation or spring.

To more fully explain my invention, reference is had to the accompanying drawings, forming a part of this specification, of which—

Figure 1 is a side elevation of the escapement.
Figure 2 is an end view.
Figure 3 is a view showing the relative position of the rollers when on the staff.
Figure 4 is a plan, showing the detent-lever, screw, upper roller, and escape-wheel.
Similar letters of reference indicate corresponding parts.

A is the balance, mounted upon the balance-staff B, with which it vibrates.

C is a crown-wheel, with escapement-teeth, as shown, or the teeth may be placed on the rim of the wheel, and whose axis is at right angles with the balance-staff.

D D are the two impulse-rollers fastened to the balance-staff, one opposite the upper edge of the escapement-wheel and the other opposite its lower edge, and having the notches $a$ $a'$ cut in them, in the relative positions shown in fig. 3, by which the balance receives an impulse alternately in each direction upon unlocking the detent-lever. If the balance passes so far as to unlock before the return vibration, the teeth will bank upon the rollers, and prevent more than one tooth from passing at the same time.

The detent-lever F is pivoted at E, so as to move easily, and has at the end a screw with two heads or projections $c$ $c'$, so situated as to have just one-half the distance between them that there is between the teeth of the escape-wheel, and adjusted to a point where they will just catch each tooth, and so lock the escape-wheel at each half beat.

A light arm, G, extends up over the roller D, and has a small projection, $d$, on its lower face, in form of a double-inclined plane. A similar projection, $e$, on the upper surface of the roller D, comes in contact with the projection $d$ at each vibration, and raises the detent and the locking-screw, so as to let the tooth pass the first head $c$, the balance receiving an impulse at the same instant from the roller D. The liberated tooth is caught by the head $c'$, thus relieving the roller from the pressure of the impulse-tooth, and allowing it to turn freely. As the balance returns in its vibration, the projection $e$ again unlocks the detent-lever, and allows the tooth to pass the second head $c'$, and an impulse to be given to the balance in the new direction from the roller D'. The next tooth is then caught by the first head $c$.

In this manner each tooth is locked twice, first, on one vibration, by the screw-head $c$, and on the next vibration by the head $c'$, while, by the construction with two rollers D and D', the balance-wheel receives an impulse in each direction. The detent-lever is also locked by gravitation or by the spring H, if it is not to run in an upright position.

Having thus described my invention, what I claim, and desire to secure by Letters Patent, is—

1. The escape-wheel C, having escape-teeth either on the side or rim, and the notched impulse-rollers D and D' above and below, constructed and operating substantially as and for the purpose herein described.

2. The detent-lever F, with the adjustable double-headed screw $c$ $c'$ or its equivalent, locking each tooth of the escape-wheel twice at each revolution, either by spring or gravitation, substantially as herein described.

3. The point $d$ on the arm G, and the point $e$ on the roller D, for unlocking, substantially as herein described.

In witness whereof, I have hereunto set my hand and seal.

WM. C. KELLUM. [L. S.]

Witnesses:
C. W. M. SMITH,
J. L. BOONE.